Jan. 31, 1950 — M. MILLER — 2,495,860
AUTOMOBILE DOOR SAFETY LOCKING DEVICE
Filed June 5, 1946
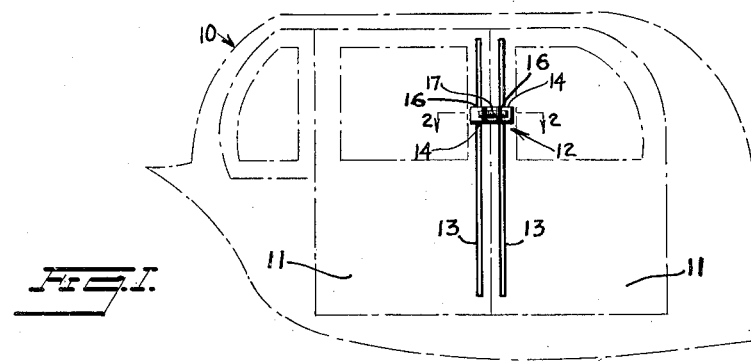
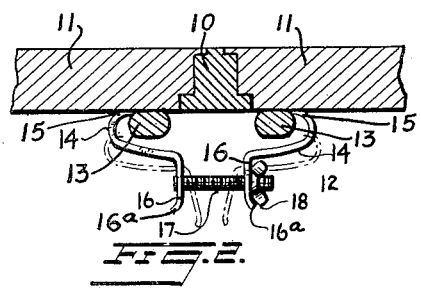
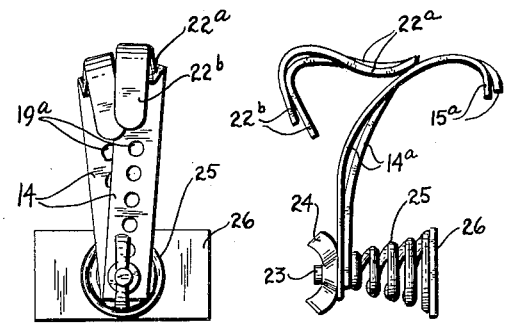
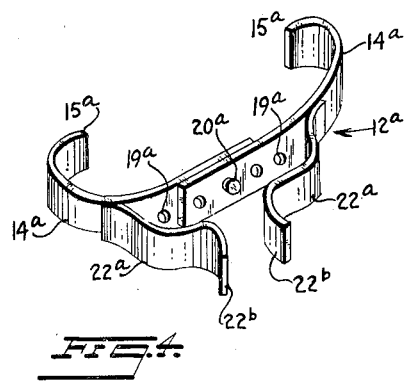
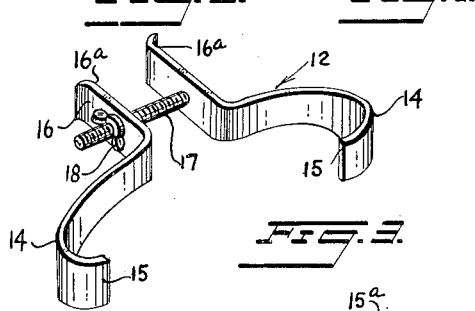
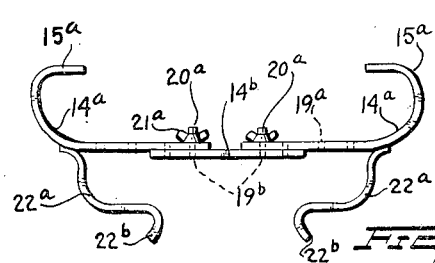
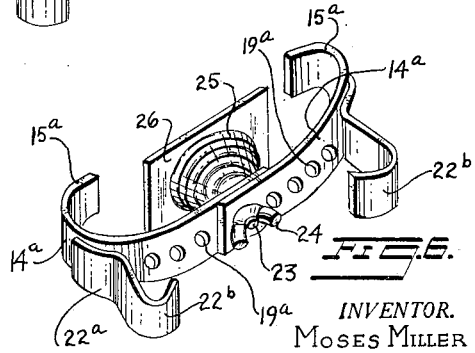
INVENTOR.
MOSES MILLER
BY
ATTORNEY Patented Jan. 31, 1950

2,495,860

UNITED STATES PATENT OFFICE 2,495,860

AUTOMOBILE DOOR SAFETY LOCKING DEVICE

Moses Miller, Brooklyn, N. Y.

Application June 5, 1946, Serial No. 674,426

6 Claims. (Cl. 292—258)

This invention relates in general to a safety locking device and in particular to a clamp type locking device adapted to lock doors of a vehicle or the like.

This invention proposes a clamp type locking device which is adapted to be removably placed on the doors of an automobile or other vehicle to prevent accidental opening of doors by children or other unauthorized people. The safety device according to this invention is particularly useful in permitting adults to secure automobile doors in a closed condition safely protected against accidental opening or against being opened by children. The device not only safely locks the doors but at the same time is quickly removable permitting an authorized person to readily open the doors.

The invention however, proposes an adjustable clamp type safety locking device for releasably locking automobile doors.

It is an additional object of this invention to provide a clamp type automobile door safety locking device adapted to simultaneously lock two adjacent automobile doors.

For further comprehension of the invention, and of the objects and advantages thereof, reference will be had to the following description and accompanying drawings, and to the appended claims in which the various novel features of the invention are more particularly set forth.

In the accompanying drawing forming a material part of this disclosure:

Fig. 1 is an inside diagrammatic view of a portion of an automobile chassis showing a locking device, in accordance with the present invention, in position locking adjacent doors.

Fig. 2 is an enlarged horizontal sectional view taken on the line 2—2 of Fig. 1.

Fig. 3 is a perspective view of the locking device, per se.

Fig. 4 is a perspective view of a locking device according to a somewhat different form of this invention.

Fig. 5 is a top plan view of the locking device constructed in accordance with another modification of the invention.

Fig. 6 is a view in perspective of the locking device constructed in accordance with a still further modification of the invention.

Fig. 7 is a side elevational view of the device shown in Fig. 6 in its folded position.

Fig. 8 is a front elevational view of the device shown in Fig. 7.

Referring to the figures in detail, in Fig. 1 is shown in outline a portion of the inside of an automobile frame generally designated 10 having a pair of adjacent doors 11 and having a safety device 12 mounted thereon and constructed in accordance with the present invention. The safety locking device 12 is mounted across the framework to nearly adjacent portions of each door and operates to secure both doors in a closed position.

In Fig. 2 there is shown in greater detail the device in its operation. On adjacent portions of the inside faces of the doors 11 there are mounted vertical beads 13 engaged by the locking device 12. The locking device 12 comprises two arm members 14 having inwardly curved hooks 15 at their ends, the hooks being adapted to engage the beads 13 and to secure the doors 11 in a substantially fixed position with respect to one another. The opposite ends 16 of the arms 14 extend substantially parallel to each other and are adjustably secured together by means of a bolt 17 and wing nut 18. The ends 16 of arms 14 extend beyond bolt 17 providing handle members 16a for grasping the device.

The use and operation of the device is essentially clear from these two figures. The doors 11 of the automobile 10 are closed, the device placed with the hooks 15 engaging the beads 13 and the wing nut 18 is tightened until these hooks securely engage the beads 13, thereby safely locking the doors. To remove the device, arms 14 are grasped near the hooks 15 and pulled apart whereby the device may be readily removed from the framework. Alternatively, the handle members 16a at the ends 16 of arms 14 may be squeezed together whereby the hooks 15 are automatically spread apart.

In the modification of the invention shown in Fig. 4, the locking device 12a comprises arms 14a having inwardly projecting hooks 15a similar in structure to the device of the previous form of the invention. The opposite ends of the arms 14a from the hooks 15a are adjustably secured together in overlapping position, and extend substantially parallel to the hooks 15a. A plurality of spaced holes 19a in the overlapping portions permit a bolt 20a to be passed through desired aligned openings and be secured in position by a wing nut, not shown, to secure the arm members 14a together with hooks 15a an adjustable distance apart, whereby the device 12a is adjustable for different spacings of the beads.

A pair of handle members 22a are mounted on the arms 14a and extend therebeyond in a direction opposite to the hooks 15a. Finger grip portions 22b at the ends of handle members 22a permit the device to be grasped. When finger grip members 22b are squeezed together it is apparent that the device flexes slightly causing the hooks 15a to be spread apart whereby the device may be readily detached or removed.

In Fig. 5 there is shown a modification of the locking device shown in Fig. 4 wherein an extension member 14b is secured between arms 14a and serves to connect the arms together. The extension member 14b is a straight bar having holes 19$^b$ to permit passage of bolt 20$^a$ for adjustable mount. This device with the extension member permits the use of the safety locking device on unusually widespread beads.

In the further modification of the locking device shown in Figs. 6, 7 and 8, the hooks 15$^a$ are similar to that shown in Fig. 4 and are provided in their overlapping arms 14$^a$ with holes 19$^a$ for relative adjustment of the parts so that clamping action of the hooks 15$^a$ may occur. Each arm 14$^a$ has welded or otherwise secured thereto the finger grips 22$^b$, and the holes 19$^a$ of each piece may be brought into register when the clamps are to be adjusted so that the threaded end of a bolt 23 may be passed through the arms 14$^a$ and secured in position by a wing nut 24 to hold them in relatively adjusted position. The end of the bolt 23 is secured to one end of a spiral spring 25 whose free end is attached to a bearing plate 26 which yieldably keeps the clamp in place on the door structure.

When the clamp is to be removed inward pressure on the arms 14$^a$ against the resistance of the spring 25 will permit the finger grips 22$^b$ to be operated to separate the hooks 15$^a$.

As shown in Figs. 7 and 8, when the safety locking device is not in use, the clamp arms 14$^a$ may be folded together, at which position the finger piece extensions 22$^a$ constitute a carrying handle and so that the device can be conveniently stored when not in use.

It is preferable that the safety locking device according to this invention be constructed of numerous materials which are somewhat flexible and yet sufficiently rigid to safely lock the doors of an automobile or the like. According to the preferred form of the invention this device will be constructed of a metal or a metal substitute having strength and structural properties in the same range as metal.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. An automobile door locking device comprising a pair of clamping arms having alignable openings in overlapped ends, handle pieces attached to said arms and presenting finger grip ends, means for adjustably connecting said arms to vary the spread thereof and secure said arms in horizontal alignment, said connecting means being operable to provide pivotal folding movement between the parts, and said connecting means comprises a bolt for selective engagement with the openings of said arms.

2. An automobile door locking device comprising a pair of clamp arms having openings therein and arranged for overlapping relation at the ends thereof to bring the openings into adjustable register to vary the spread of the arms, handle pieces secured at one end to said arms and terminating in the opposite ends in finger grips, a bolt for engagement with said openings, a spring mounted on said bolt and disposed within said clamp arms and a bearing plate on the spring for engagement with a door part to yieldably maintain the clamp in place.

3. An automobile door locking device comprising a pair of clamp arms having openings therein and arranged for overlapping relation at the ends thereof to bring the openings into adjustable register to vary the spread of the arms, handle pieces secured at one end to said arms and terminating in the opposite ends in finger grips, a bolt for engagement with said openings, a spring mounted on said bolt and disposed within said clamp arms, a bearing plate on the spring for engagement with a door part to yieldably maintain the clamp in place, and said finger pieces being operable to flex the ends of said clamp arms to disengage the same from gripping contact with the automobile door.

4. An automobile door locking device comprising a pair of clamp arms having openings therein and arranged for overlapping relation at the ends thereof to bring the openings into adjustable register to vary the spread of the arms, handle pieces secured at one end to said arms and terminating in the opposite ends in finger grips, a bolt for engagement with said openings, a spring mounted on said bolt and disposed within said clamp arms, a bearing plate on the spring for engagement with a door part to yieldably maintain the clamp in place, said finger pieces being operable to flex the ends of said clamp arms to disengage the same from gripping contact with the automobile door, said bolt being releasable to provide for relative pivotal movement of said arms to folded position and said handle pieces providing lift means for carrying the folded device.

5. An automobile door-locking device, comprising a pair of clamp arms having adjacent ends overlapped and their other ends bent into hooks for engagement with parts of adjacent automobile doors, said overlapped ends of said arms being formed with selectively alignable openings for vary the spread of said hooks, a bolt engageable with an aligned pair of said openings for securing the arms together in desired relative adjusted positions, a coil spring secured at one end to said bolt and disposed between said hooks, and a bearing plate mounted on the free end of said spring for engagement with a fixed portion of the automobile.

6. An automobile door-locking device, comprising a pair of clamp arms having adjacent ends overlapped and their other ends bent into hooks for engagement with beads mounted on the inside faces of adjacent automobile doors, said overlapped ends of said arms being formed with selectively alignable openings for varying the spread of said hooks, a bolt engageable with an aligned pair of said openings for securing the arms together in desired relative adjusted positions, a coil spring secured at one end to said bolt and disposed between said hooks, and a bearing plate mounted on the free end of said spring for engagement with a fixed portion of the automobile, and a handle piece for each clamp arm, each handle piece being secured at one end to an intermediate portion of its respective clamp arm and having its other end bent into a finger grip.

MOSES MILLER.

REFERENCES CITED

The following references are of record in the file of this patent:

UNITED STATES PATENTS

| Number | Name | Date |
| --- | --- | --- |
| 1,059,579 | Tobey | Apr. 22, 1913 |
| 1,571,543 | Fratzke | Feb. 2, 1926 |
| 1,639,870 | Valsvig | Aug. 23, 1927 |
| 1,845,338 | Querna | Feb. 16, 1932 |